Patented Nov. 26, 1946

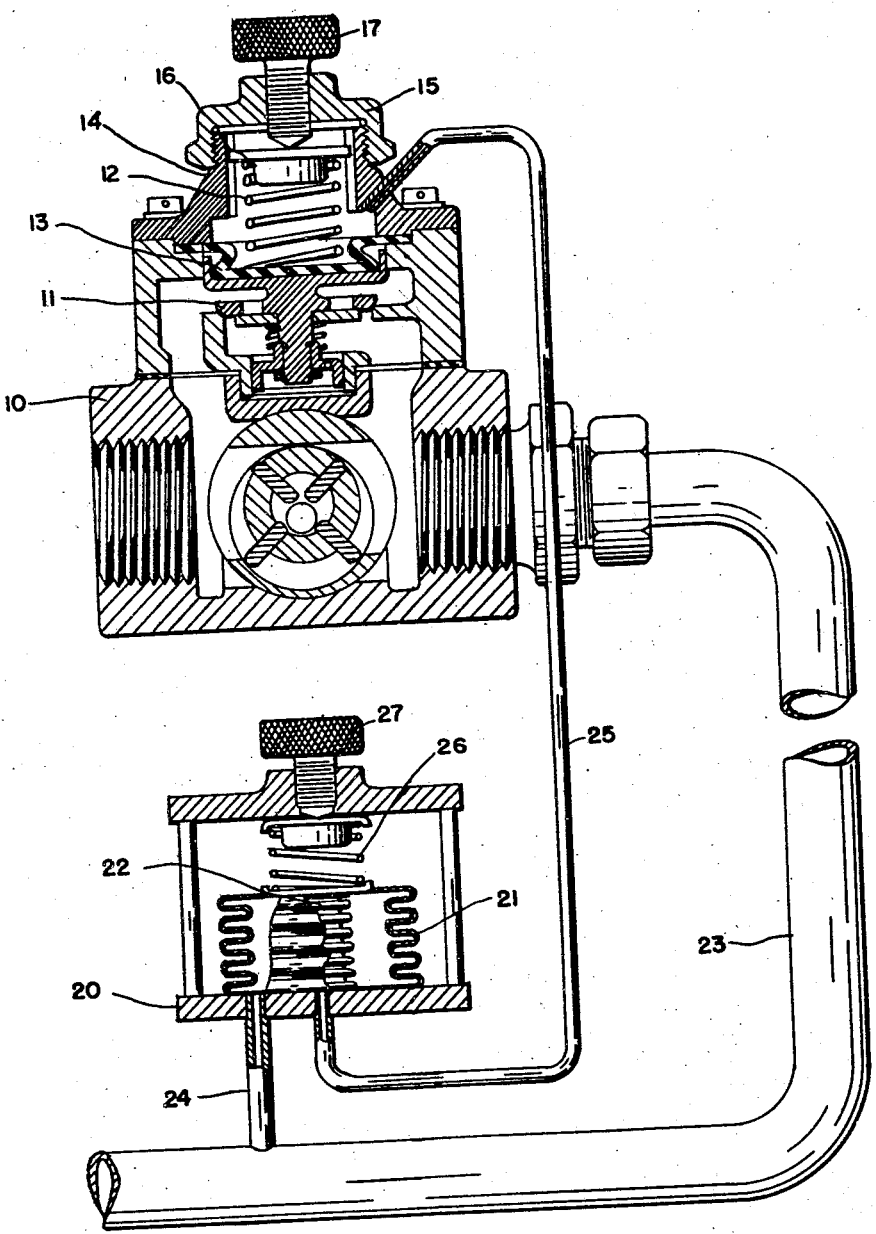

2,411,574

UNITED STATES PATENT OFFICE 2,411,574

PUMP CONTROL WITH LINE LOSS COMPENSATION

Scott F. Hunt, Meriden, Conn., assignor to Chandler-Evans Corporation, South Meriden, Conn., a corporation of Delaware Application March 6, 1944, Serial No. 525,160

6 Claims. (Cl. 103—42)

This invention relates to means for maintaining a constant pressure in a fluid supply line at a point remote from a pressure creating device.

More particularly the invention relates to a device or means for maintaining the pressure within the feed line of an aircraft engine at constant pressure at the carburetor intakes when they are at a distance from the fuel pump.

A feature of the invention that enables the above object to be accomplished is that a variable pressure is applied to the pump relief or by-pass valve so that when the pressure at any predetermined point in the delivery line of the pump varies, the pressure delivered by the pump may be varied to maintain the pressure at the predetermined point constant.

Another object of the invention is to provide a pressure amplifier at the point in the line desired to be maintained at constant pressure so that a variation in pressure at this point may be converted into an amplified pressure change and this latter pressure applied to supplement the loading of the fuel pump by-pass valve.

With the above and other objects in view the invention may include the features of construction and operation set forth in the following specification and illustrated in the accompanying drawing.

In the accompanying drawing annexed hereto and forming a part of this specification, I have shown the invention embodied in the delivery line of a standard type of fuel pump but it will be understood that the invention can be otherwise embodied and that the drawing is not to be construed as defining or limiting the scope of the invention, the claims appended to this specification being relied upon for that purpose.

In the drawing the figure shows a cross sectional view of a fuel pump having a pressure amplifier in its delivery line at a point remote from the pump.

In the above-mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a fuel pump which may be of standard type having a relief valve incorporated therein, the pressure acting against which may be supplemented by increasing or decreasing the pressure above a flexible diaphragm connected thereto; second, a pressure amplifier comprising Sylphon bellows, one within the other, the outer one of which is connected to the delivery line of the pump at the point hereinafter referred to as the control point, desired to be maintained at a constant pressure, and the inner one of which is directly connected to the space within the fuel pump above the relief valve diaphragm.

In the operation of fuel pumps which normally are set for a predetermined pressure, the delivery point of the pumped fuel may be at a considerable distance from the pump and subject, therefore, to a pressure drop due to the velocity of flow through the interconnecting conduit. With variations of velocity within the delivery conduit this drop in pressure may vary substantially. It is therefore an object of the invention to provide simple but efficient means whereby the pressure at any control point in the delivery conduit of a pump can be maintained at constant pressure under varying conditions of flow through the conduit.

Referring more in detail to the figure of the drawing, it will be seen that a pump 10 of the rotating radially movable vane type is provided which may be rotated by any means (not shown). In order to control the pressure delivered by this pump a relief or by-pass valve 11 is biased toward closed position by a spring 12, the pressure of which may be adjusted as required.

In the form of pump shown in the drawing a flexible diaphragm 13 is provided in a portion of the pump casing against which the spring 12 operates so that the diaphragm 13 forms a flexible seal for the pump and permits movements of the valve 11. The space within the casing of the pump 10 above the diaphragm 13 is closed as by means of a bonnet member 14 and a cap member 15 threadedly attached to the upper portion of the bonnet 14. To vary the pressure of the spring 12 acting on the diaphragm 13 and by-pass valve 11 the upper end of the spring 12 bears against a pressure plate 16 suitably guided within the bonnet member 14, the position of which may be varied by adjustment of a screw 17.

At the control point, a pressure amplifier 20 is provided of the multiple Sylphon bellows type. It will be noted that there are two flexible metal bellows 21 and 22, one within the other, the space within the outer bellows 21 being connected directly to the delivery pipe 23 by means of a branch conduit 24. Enclosed within this bellows is the second bellows 22 of much smaller diameter than the first and this bellows has its interior space directly connected by a conduit 25 extending to the space within the pump casing 10 and directly above the flexible diaphragm 13. A spring 26, the pressure of which may be varied by adjustment of screw 27, presses against the upper surface of the inner and outer bellows to vary the pressure acting thereon. Movement of the outer bellows 21 by variations of pressure in discharge conduit 23 causes the inner bellows 22 to move correspondingly. Both bellows have their end walls attached together and are free to expand and contract by movement upward and downward of their upper ends against the pressure of spring 26.

It will be seen from the above description that a slight reduction in pressure within the discharge line 23 of the pump will reduce the pressure within the outer bellows 21 and cause this member to correspondingly compress the inner bellows 22 which will increase the pressure therein. This increase in pressure within bellows 22 will act directly upon the flexible diaphragm 13 of the pump. This increased pressure upon the flexible diaphragm 13 will therefore hold down the by-pass valve 11 with a correspondingly increased pressure and thus cause the pump 10 to correspondingly increase its delivery pressure. Similarly when the pressure at the control point increases the capacity of the outer bellows will increase and force the inner bellows to expand. This movement of the inner bellows 22 decreases the pressure within the inner bellows and reduces the pressure acting on the flexible diaphragm 13. The discharge pressure will therefore be reduced proportionately to the increased pressure at conduit 24.

The area at the free end of bellows 21 on which the pressure within that bellows acts upwardly is greater than the area on which the pressure within bellows 22 acts upwardly. Therefore, it may be seen that a given change in pressure within bellows 21 produces an inversely proportional, but greater change in pressure within bellows 22.

Any change in pressure at the control point thereby causes an amplified inverse change in pressure above the diaphragm 13. For example, if the pressure at the control point decreases, the pressure above diaphragm 13, and hence the pump discharge pressure, is increased by a greater amount. This greater increase in the pump discharge pressure not only counteracts the original change in pressure at the control point, but also counteracts the increased friction losses in the line due to the increased flow therethru at the higher pressure. By properly adjusting the screws 17 and 27, the pressure at the control point may be held substantially constant.

The variations in pressure within the conduit 23 therefore cause variations in pressure within the valve casing above the flexible diaphragm 13 which will add to or subtract from the pressure of the spring 12 acting on the valve 11 and thus will vary the pressure of the fluid delivered by the pump.

I claim:

1. A pressure maintaining device for pump discharge conduits comprising, a pump having a pressure controlled by-pass valve, means to adjust the pressure acting on said valve, pneumatic means to supplement the pressure acting on said valve, and a pressure amplifier connected to said conduit at a point remote from said pump to vary the pressure of said pneumatic means with variations of pressure within said discharge conduit.

2. A pressure maintaining device for pump discharge conduits comprising, a pump having a pressure controlled by-pass valve, means to adjust the pressure acting on said valve, pneumatic means to supplement the pressure acting on said valve, and a pressure amplifier connected to said conduit at a point remote from said pump to increase the pressure of said pneumatic means proportionately to a reduction of pressure within said discharge conduit.

3. A pressure maintaining device for pump discharge conduits comprising, a pump having a pressure controlled by-pass valve, means to adjust the pressure acting on said valve, pneumatic means to supplement the pressure acting on said valve, and a pressure amplifier connected to said conduit at a point remote from said pump, said amplifier having a bellows subjected to variations in pressure within said conduit and acting on a second bellows to increase the pressure therein, whereby the pressure of said pneumatic means will be varied with variations of pressure within said discharge line.

4. Apparatus for regulating the discharge pressure of a pump which discharges thru a long conduit, comprising a relief valve subject to the pump discharge pressure, a spring biasing said relief valve closed against the action of said discharge pressure, an expansible chamber having a movable wall connected to said valve so that the pressure in said chamber acts on said valve in opposition to said discharge pressure, means responsive to the pressure in said conduit at a point remote from said pump for producing a control pressure greater than said conduit pressure and for varying said control pressure oppositely and proportionally with variations in said conduit pressure, and means for communicating said control pressure to said chamber to vary said pump discharge pressure in a sense opposite to the variations in said conduit pressure so as to compensate for the pressure drop in said conduit between said pump and said point and thereby to maintain a substantially constant pressure at said point.

5. Apparatus for regulating the discharge pressure of a pump which discharges thru a long conduit, comprising a relief valve subject to the pump discharge pressure, a spring biasing said relief valve closed against the action of said discharge pressure, an expansible chamber having a movable wall connected to said valve so that the pressure in said chamber acts on said valve in opposition to said discharge pressure, means responsive to the pressure in said conduit at a point remote from said pump for producing a control pressure varying oppositely with variations of said conduit pressure, and means for communicating said control pressure to said chamber to vary said pump discharge pressure in a sense opposite to the variations in said conduit pressure so as to compensate for the pressure drop in said conduit between said pump and said point and thereby to maintain a substantially constant pressure at said point.

6. Apparatus for regulating the discharge pressure of a pump which discharges thru a long conduit, comprising a relief valve subject to the pump discharge pressure, a spring biasing said relief valve closed against the action of said discharge pressure, an expansible chamber having a movable wall connected to said valve for applying a variable control force thereto, means responsive to the pressure in said conduit at a point remote from said pump for producing a control pressure varying as a function of said conduit pressure; and means for communicating said control pressure to said chamber to vary said pump discharge pressure in a sense opposite to the variations in said conduit pressure so as to compensate for the pressure drop in said conduit between said pump and said point and thereby to maintain a substantially constant pressure at said point.

SCOTT F. HUNT.